United States Patent
Sun et al.

(10) Patent No.: US 8,238,640 B2
(45) Date of Patent: Aug. 7, 2012

(54) DISPLAY TESTING APPARATUS AND METHOD

(75) Inventors: Jian Sun, Shenzhen (CN); Hua-Dong Cheng, Shenzhen (CN); Wen-Chuan Lian, Taipei Hsien (TW); Han-Che Wang, Taipei Hsien (TW); Xiao-Guang Li, Shenzhen (CN); Kuan-Hong Hsieh, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 999 days.

(21) Appl. No.: 12/205,925

(22) Filed: Sep. 8, 2008

(65) Prior Publication Data

US 2009/0087078 A1    Apr. 2, 2009

(30) Foreign Application Priority Data

Sep. 28, 2007  (CN) .......................... 2007 1 0123706

(51) Int. Cl.
*G06K 9/00*    (2006.01)

(52) U.S. Cl. ...................................................... 382/141
(58) Field of Classification Search .................. 382/141, 382/289

See application file for complete search history.

(56) References Cited

U.S. PATENT DOCUMENTS

| | | | |
|---|---|---|---|
| 5,742,698 A * | 4/1998 | Minami et al. ................ 382/100 |
| 5,818,976 A * | 10/1998 | Pasco et al. .................... 382/289 |
| 7,907,794 B2 * | 3/2011 | Hartmann et al. ............. 382/289 |
| 2003/0035593 A1* | 2/2003 | Rombola et al. .............. 382/289 |
| 2005/0285617 A1* | 12/2005 | Weng et al. .................... 324/770 |
| 2008/0112023 A1* | 5/2008 | Watanabe ...................... 358/514 |

* cited by examiner

*Primary Examiner* — Bhavesh Mehta
*Assistant Examiner* — Nirav G Patel
(74) *Attorney, Agent, or Firm* — Altis Law Group, Inc.

(57) ABSTRACT

A display testing method applied on an apparatus is provided, the apparatus being connected with an image capturing device. The method includes: controlling the image capturing device to capture and store images of displays to be tested; determining a first vertex of a test area on the captured image, determining a test area according to the determined first vertex; and testing parameters of the display according to the test area.

11 Claims, 12 Drawing Sheets

DISPLAY TESTING APPARATUS AND METHOD

BACKGROUND

1. Field of the Invention

The present invention relates to a display testing apparatus and method.

2. Description of Related Art

As a part of the manufacturing process, displays need to be tested. Before displays can be made available on the market, certain parameters, such as pixel conditions and color uniformity, must be tested to conform to requirements.

Currently, certain parameters of displays are being tested manually, such as the process of testing for bad pixels. When testing for bad pixels within display, the to-be-tested displays are adjusted to display in gray scale, which allow workers to examine the display and determine whether it contains bad pixels. Because a large volume of displays need to be tested daily, workers are easily overwhelmed with fatigue, thereby leading to low efficiency and error-prone testing. Additionally, workers will be especially prone to eye damage.

Although electronic testing apparatuses, such as Automated Optical Inspection (AOI), are used to test display with high efficiency and accuracy, such apparatuses are expensive. Additionally, due to different working principles that are employed within different types of display, such as liquid crystal display (LCD), cathode-ray tube (CRT) display, and reflective display, different electronic testing apparatuses are needed to test each particular type of display. Thus, manufacturers of multiple types of display need to purchase a different electronic testing apparatus for each type.

Therefore, what is needed is a display testing apparatus and method which can test multiple types of displays.

SUMMARY

A display testing method applied on an apparatus is provided, the apparatus being connected with an image capturing device. The method includes: controlling the image capturing device to capture and store images of to-be-tested display unit; determining a first vertex of a test area on the captured image, determining a test area according to the determined first vertex; and testing parameters of the display according to the test area. The first vertex determining step further includes: determining a predetermined rectangular area which includes the first vertex, and determining boundary pixels according to RGB values of each pixel in the predetermined rectangular area; determining the first vertex among the determined boundary pixels according to coordinates of the boundary pixels. The test area determining step further includes: lining the boundary pixels of the right side of the first vertex through the first vertex to obtain a first border, and lining the boundary pixels of the left side of the first vertex through the first vertex to obtain a second border; reading pixels of the captured image from the first vertex until a first boundary pixel is found along a first direction, determining a first line parallel to the second border through the first boundary pixel to obtain a third border of the test area, and obtaining a second vertex which is an intersection between the third border and the first border; reading pixels of the captured image from the second vertex until a first boundary pixel is found along a second direction; determining a second line parallel to the first border through the first boundary pixel to obtain a fourth border of the test area; obtaining a third vertex which is an intersection between the fourth border and the second border; obtaining a fourth vertex which is an intersection between the fourth border and the third border, and defining the test area according to the first vertex, the second vertex, the third vertex, and the fourth vertex.

Other advantages and novel features will be drawn from the following detailed description of the preferred embodiment with reference to the attached drawings.

BRIEF DESCRIPTION OF THE DRAWINGS

The components of the drawings are not necessarily drawn to scale, the emphasis instead being placed upon clearly illustrating the principles of a display testing apparatus. Moreover, in the drawings, like reference numerals designate corresponding parts throughout several views.

DETAILED DESCRIPTION

Figure 1:
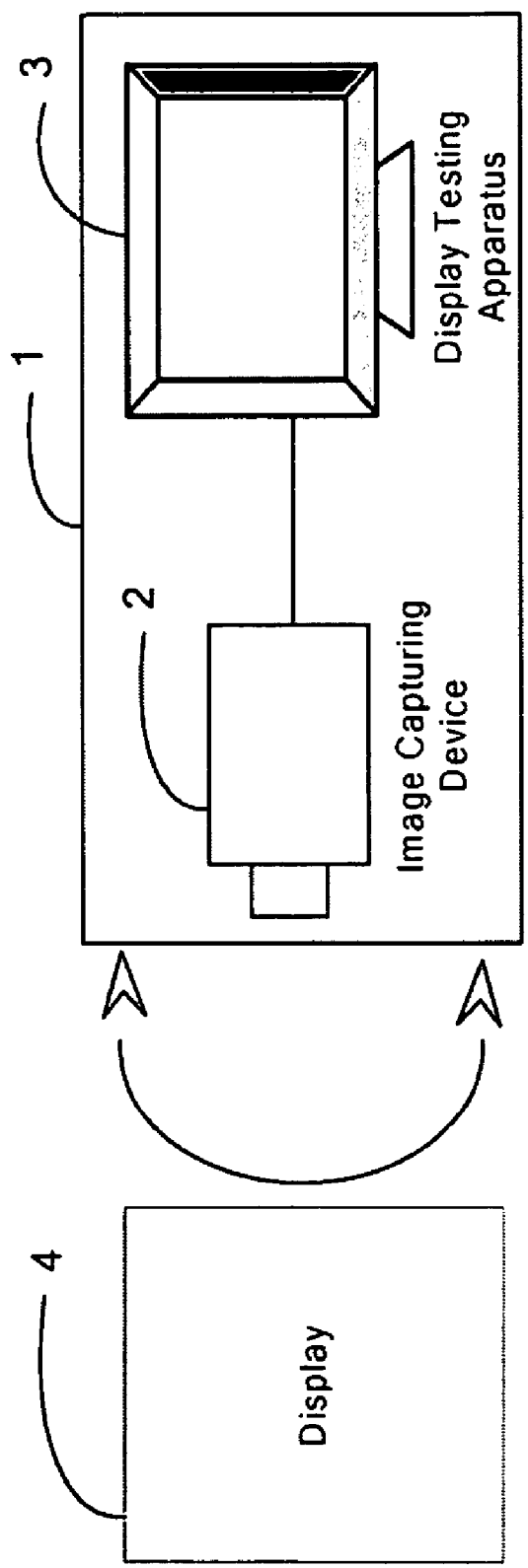
FIG. 1 is a schematic diagram of a display testing system in accordance with an exemplary embodiment of the present invention.

FIG. 1 is a schematic diagram of a display testing system (hereinafter referred to as "the system") in accordance with an exemplary embodiment of the present invention. The system 1 includes an image capturing device 2 and a display testing apparatus 3 (hereinafter referred to as "the apparatus"). The image capturing device 2 is connected to the apparatus 3 via an interface such as a universal serial bus (USB) (not shown). The image capturing device 2 is used for capturing images of a to-be-tested display 4 and transmitting the captured images to the apparatus 3 to test. The image capturing device 2 can be a scanner or a camera.

Figure 2:
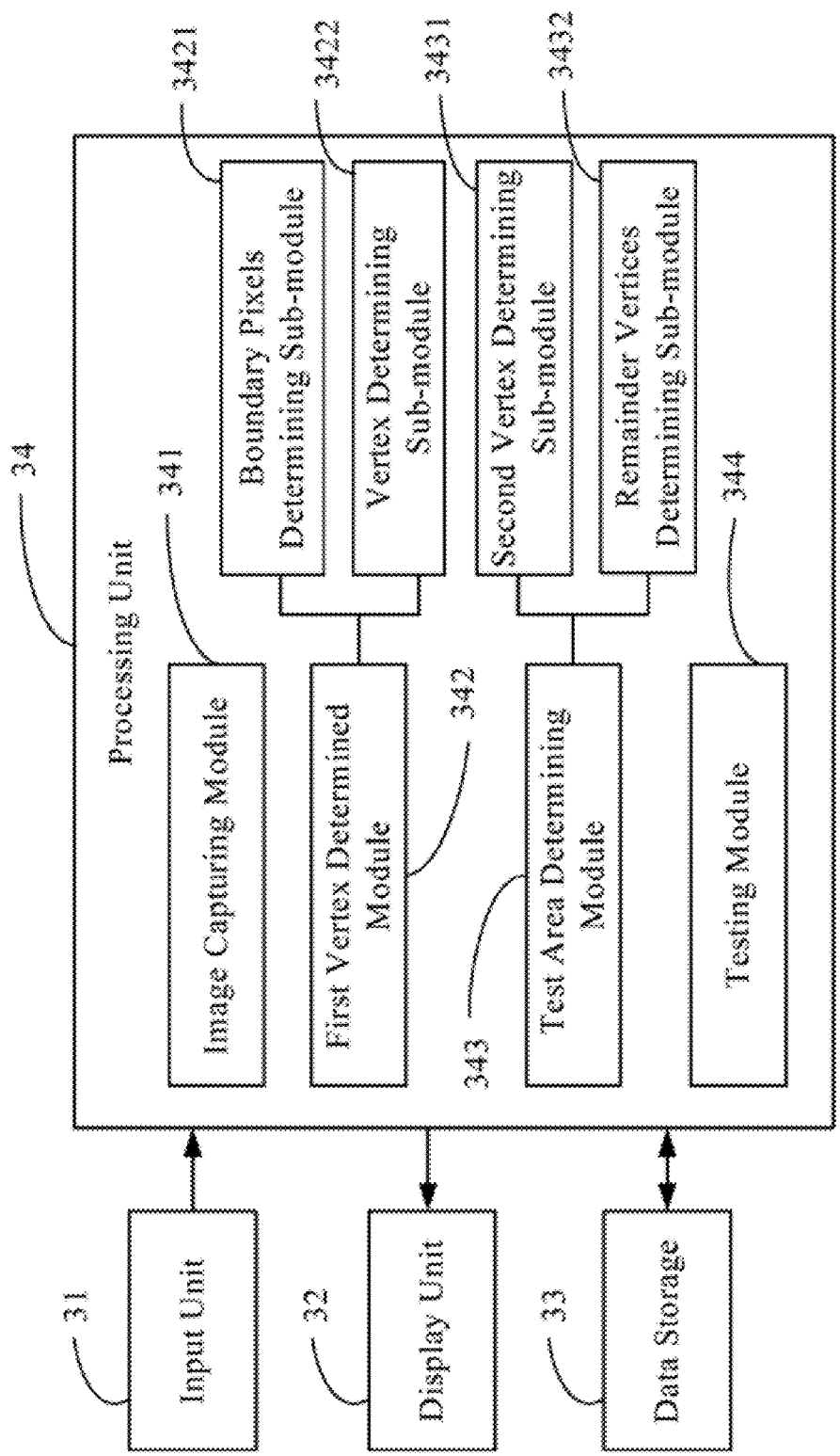
FIG. 2 is a functional block diagram of a display testing apparatus of FIG. 1 in accordance with an exemplary embodiment of the present invention.

FIG. 2 is a functional block diagram of the apparatus 3 in accordance with an exemplary embodiment of the present invention. The apparatus 3 includes an input unit 31, a display unit 32, a data storage 33, and a processing unit 34. The input unit 31 is used for generating input information in response to operations of the user and transmitting the input information to the processing unit 34 to process. The display unit 32 is used for displaying information related to a testing process, such as the test results, for the display 4. The data storage 33 is used for storing data generated in the testing process and the images captured from the image capturing device 2.

The processing unit 34 includes an image capturing module 341, a first vertex determining module 342, a test area determining module 343, and a testing module 344. The image capturing module 341 is used for receiving the input information from the input unit 31 and generating an image capturing instruction when the input information is for capturing the images of the display 4. The image capturing module 341 is further used for controlling the image capturing device 2 to capture images of the display 4, subsequently transmitting the captured images to the display unit 32 to display. The first vertex determining module 342 is for determining a first vertex of a testing area on the image of the display 4. In this embodiment, the first vertex is the top left corner of the test area. The first vertex determining module 342 includes a boundary pixels determining sub-module 3421 and a vertex determining sub-module 3422. Refer to FIGS. 3-6 for a detailed description of functions of the boundary pixels determining sub-module 3421 and the vertex determining sub-module 3422. The test area determining module 343 is for determining a test area of the captured image of the display 4. The test area of the captured image of the display 4 is a part of the captured image where a screen of the display 4 is represented. The test area determining module 343 includes a second vertex determining sub-module 3431 and a remainder vertices determining sub-module 3432. Refer to FIGS. 7-12 for a detailed description of functions of the second vertex determined module 3431 and the remainder vertices determining module 3432. The testing module 344 is used for testing related parameters of the display 4, such as dead pixels, according to the determined test area.

The boundary pixels determining sub-module 3421 is used for determining a predetermined rectangular area which includes the first vertex, and for determining boundary pixels according to the RGB value of each pixel in the rectangular area. The boundary pixels are used for determining borders of the test area. That is, the boundary pixels form lines to obtain the borders of the test area. The vertex determining sub-module 3422 is used for determining the first vertex among the determined boundary pixels in the predetermined rectangular area according to the coordinates of the boundary pixels.

During the process of determining the first vertex, the boundary pixels determining sub-module 3421 obtains an RGB value of each pixel row-by-row. Namely, the boundary pixels determining sub-module 3421 obtains the RGB values of the pixels starting from the leftmost pixel of the predetermined rectangular area to the rightmost pixel of the predetermined rectangular area horizontally row-by-row. For example, assuming a size of the predetermined rectangular area is L*S (wherein L represents a number of the pixels in a horizontal direction, S represents a number of the pixels in a vertical direction), a coordinate of a current pixel is Tn(i,m) (wherein i represents a horizontal coordinate of the pixel $T_n$, m represents a vertical coordinate of the pixel $T_n$). If i<L, the horizontal coordinate of a next pixel is Tn+1(i+1,m). If i=L, the horizontal coordinate of the next pixel is Tn+1(0,m+1).

The boundary pixels determining sub-module 3421 can also obtain the RGB values of the pixels from the topmost pixel of the predetermined rectangular area to the bottommost pixel of the predetermined rectangular area vertically column-by-column. For example, assuming the coordinate of a current pixel is Tn(i,m), if m<S, the coordinate of a next pixel is Tn+1(i,m+1). If m=S, the coordinate of the next pixel is Tn+1(i+1,0).

A detailed description on determining the first vertex is described as follows.

Figure 3:
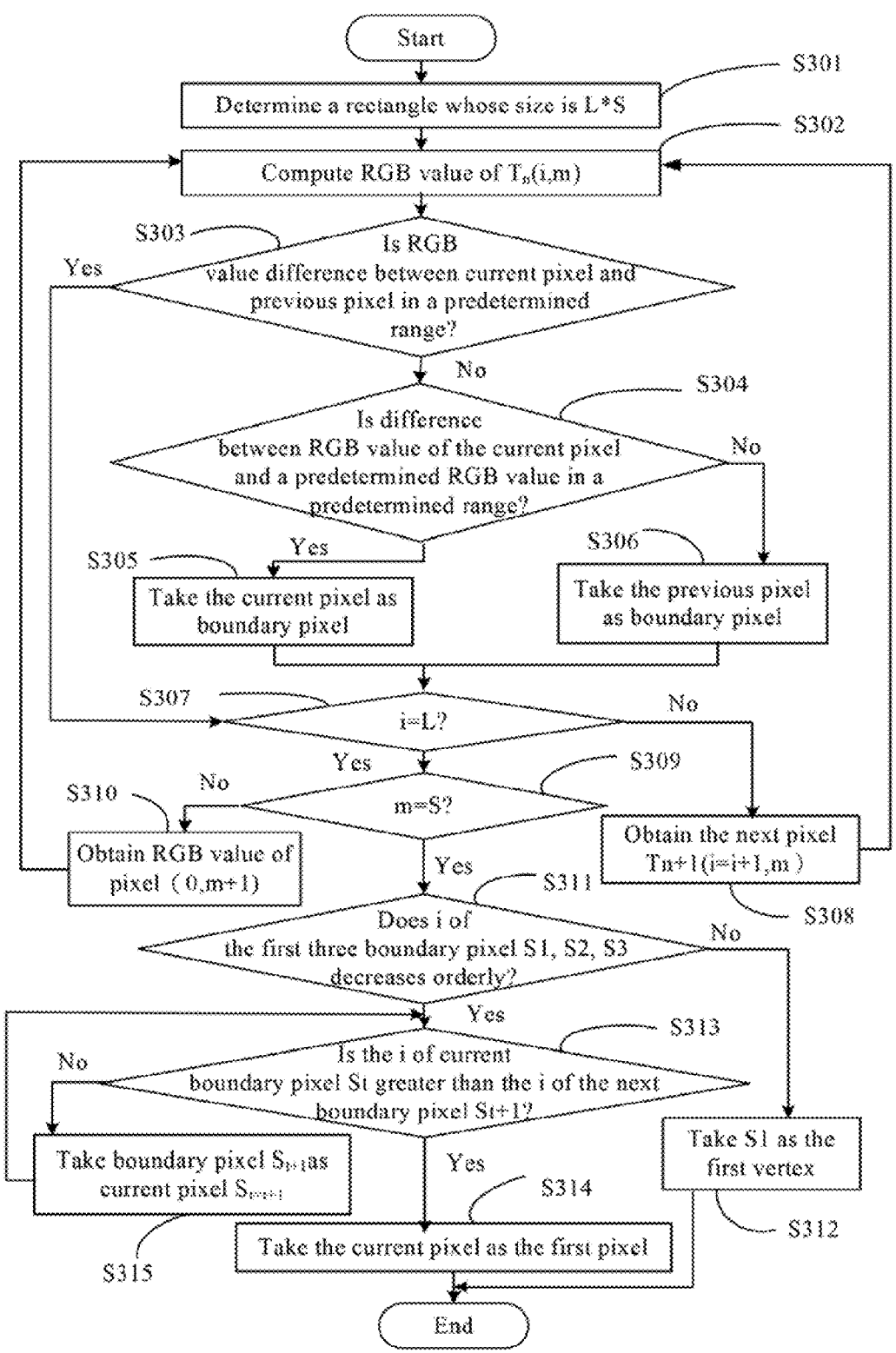
FIG. 3 is a flowchart for determining a first vertex of a test area in accordance with an exemplary embodiment of the present invention.

FIG. 3 is a flowchart of determining the first vertex of the test area implemented by the first vertex determining module 342. For a detailed description, refer to FIGS. 4-6, which are a series of schematic diagrams showing how to determine the test area when the captured image is tilted to the left, the right, or does not tilt.

In step S301, the boundary pixels determining sub-module 3421 determines the predetermined rectangular area, which includes the first vertex. The size of the predetermined rectangular area is L*S. The position and size of the predetermined rectangular area can be set by a user, or can be a system default value.

In step S302, the boundary pixels determining sub-module 3421 computes and records the RGB value of the current pixel $T_n(i,m)$.

In step S303, the boundary pixels determining sub-module 3421 determines whether an RGB value difference D1 between the pixel $T_n(i,m)$ and the pixel $T_{n-1}(i-1,m)$ is out of a first predetermined range. If the RGB value difference D1 is not out of the first predetermined range, the procedure goes to step S307.

If the RGB value difference D1 is out of the first predetermined range, in step S304, the boundary pixels determining sub-module 3421 determines whether an RGB value difference D2 between the RGB value of the pixel $T_n(i,m)$ and a predetermined RGB value is out of a second predetermined range.

If the RGB value difference D2 is not out of the second predetermined range, in step S305, the boundary pixels determining sub-module 3421 takes the current pixel $T_n(i,m)$ as a boundary pixel $S_t$ and records the coordinate of the current pixel $T_n(i,m)$ to the data storage 33. The variable t is used for identifying the boundary pixel. For example, $S_1$, $S_2$, and $S_3$ respectively represents the first, the second, and the third boundary pixel.

If the RGB value difference D2 is out of the second predetermined range, in step S306, the boundary pixels determining sub-module 3421 takes the pixel $T_{n-1}(i-1,m)$ as a boundary pixel and records the coordinate of the pixel $T_{n-1}(i-1,m)$ to the data storage 33.

In step S307, the boundary pixels determining sub-module 3421 determines whether the current pixel $T_n(i,m)$ is a last pixel in a current row (i.e., the mth row). That is, the boundary pixels determining sub-module 3421 determines whether i is equal to L.

If i is not equal to L, in step S308, the boundary pixels determining sub-module 3421 obtains the next pixel $T_{n+1}$ (i=i+1,m), and then goes to step S302.

If i is equal to L, in step S309, the boundary pixels determining sub-module 3421 determines whether m is equal to S. That is, the boundary pixels determining sub-module 3421 determines whether the current row is the last row of the predetermined rectangular area.

If m is not equal to S, in step S310, the boundary pixels determining sub-module 3421 obtains the first pixel of the next row. That is, the boundary pixels determining sub-module 3421 obtains the pixel $T_{n+1}(0,m+1)$, and then the procedure goes to step S302.

If m is equal to S, in step S311, the vertex determining sub-module 3422 determines whether the horizontal coordinates of the three boundary pixels S1, S2, S3 are in descending order.

Figure 5:
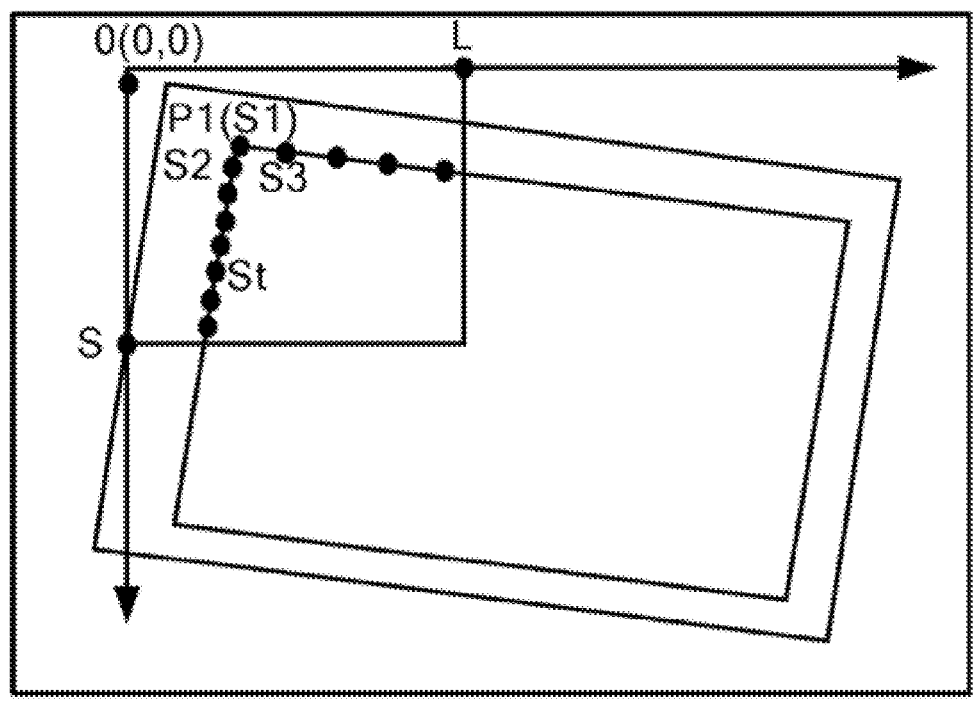
Figure 6:
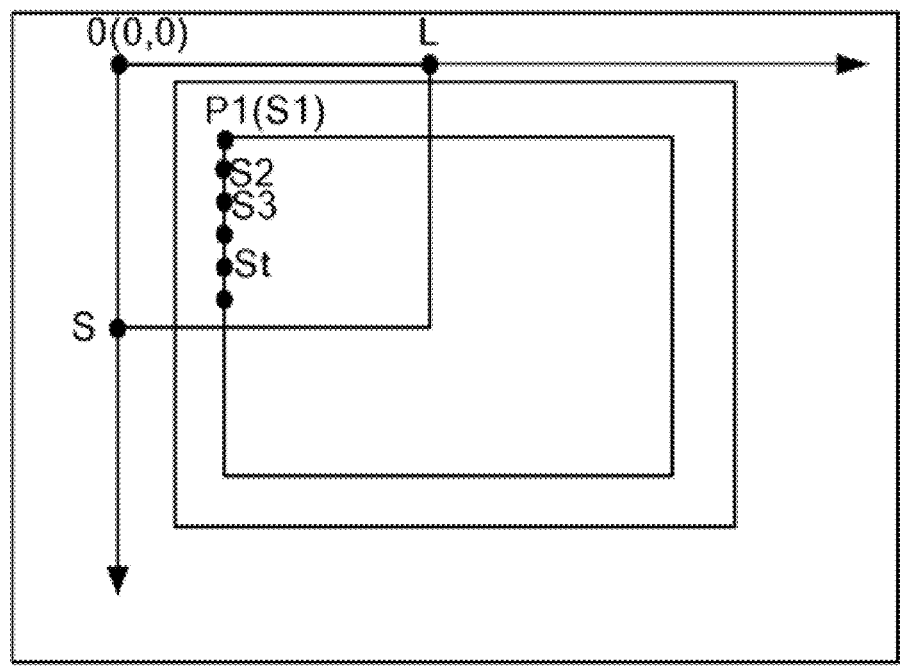

If the horizontal coordinates i of the three boundary pixels S1, S2, S3 are not in descending order, as shown in FIGS. 5-6, that means the image of the display 4 tilts to the right. In step S312, the vertex determining sub-module 3422 determines that the first boundary pixel S1 is a first vertex P1 of the test area according to a slant character of an image. That is, when the image tilts to the right, the first boundary pixel S1 is a first vertex P1; when the image tilts to the left, the horizontal coordinate i of the first vertex P1 is the minimum.

Figure 4:
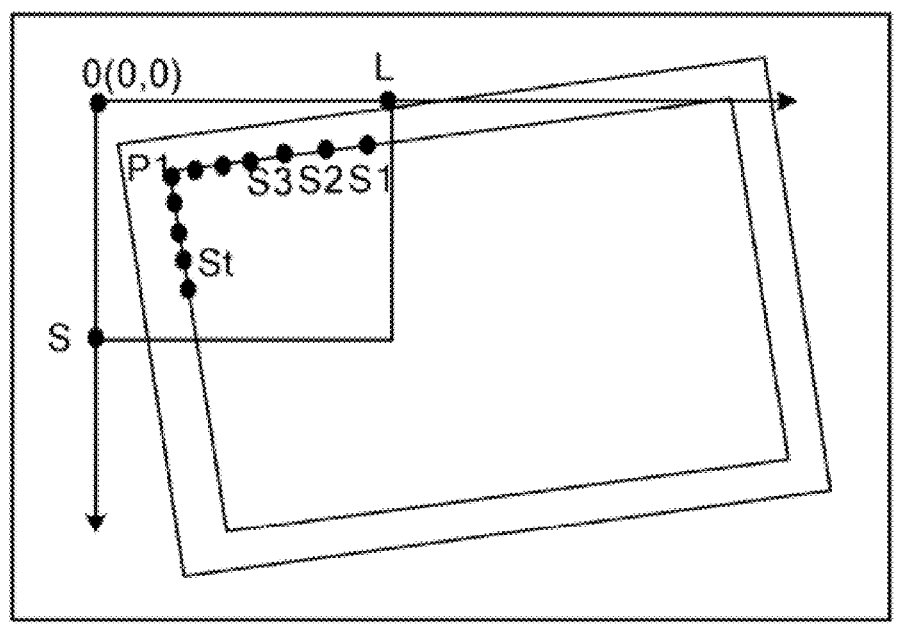
FIGS. 4-6 are schematic diagrams respectively showing a determined first vertex of the test area on a captured image of a display of FIG. 1 when the captured image tilts to the left, the right, and does not tilt.

If the horizontal coordinates i of the three boundary pixels S1, S2, S3 are in descending order, as shown in FIG. 4, that means the image of the display 4 tilts to the left. In step S313, the vertex determining sub-module 3422 determines whether the horizontal coordinate i of the current boundary pixel $S_t$ is greater than the horizontal coordinate i of the next boundary pixel $S_{t+1}$.

If the horizontal coordinate i of the current boundary pixel $S_t$ is not greater than the horizontal coordinate i of the next boundary pixel $S_{t+1}$, in step S314, the vertex determining sub-module 3422 determines the current boundary pixel $S_t$ is a first vertex P1 of the test area.

If the horizontal coordinate i of the current boundary pixel $S_t$ is greater than the i of the next boundary pixel $S_{t+1}$, in step S315, the boundary pixel $S_{t+1}$ is taken as the current boundary pixel, namely, $S_{t=t+1}$, and repeats step S313 until the first vertex P1 is found.

After the first vertex P1 of the test area has been determined, the test area determining module 343 determines the test area of the image of the display 4 according the first vertex P1.

Figure 7:
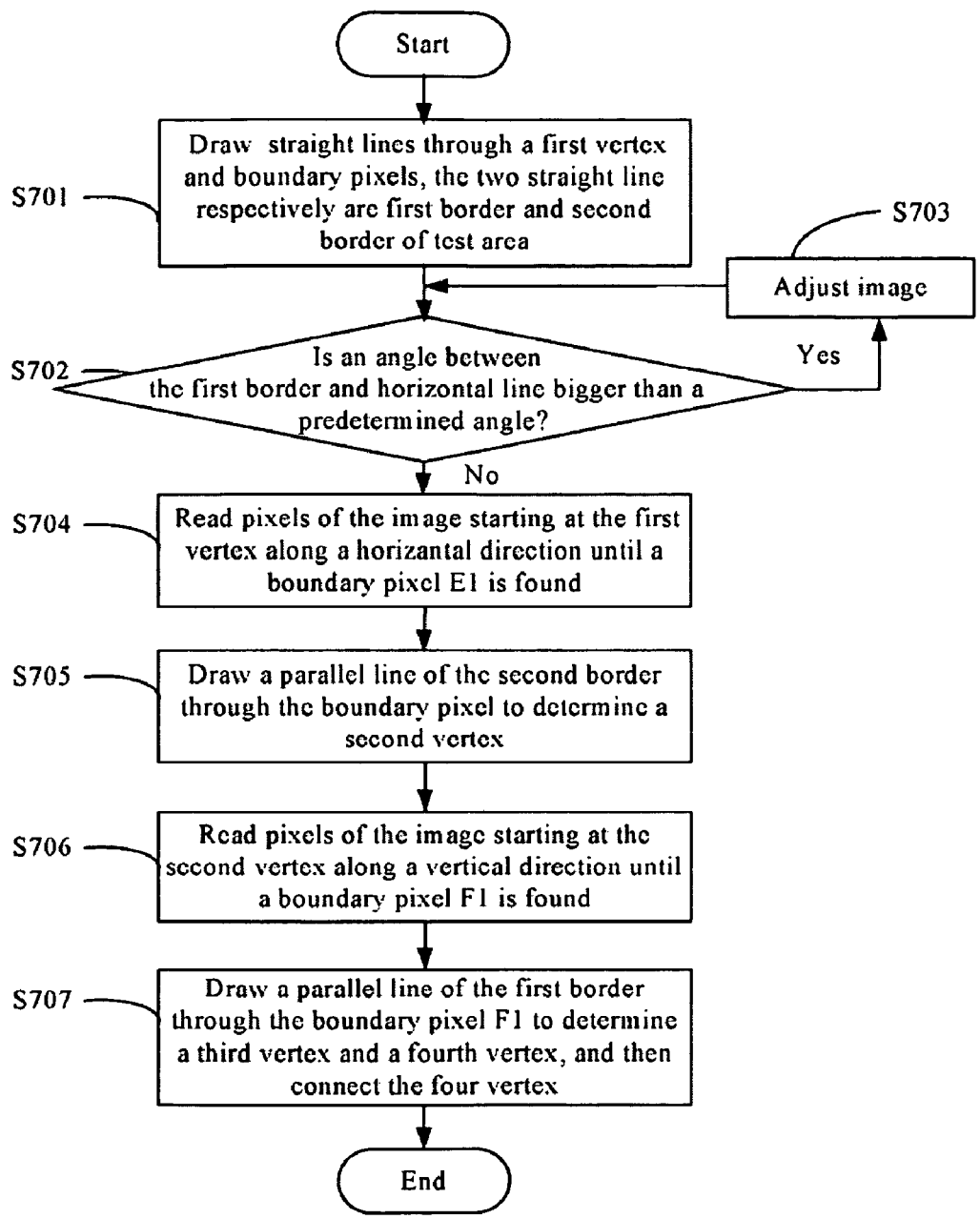
FIG. 7 is a flowchart for determining the test area when the captured image of the display of FIG. 1 tilts to the left.
Figure 8:
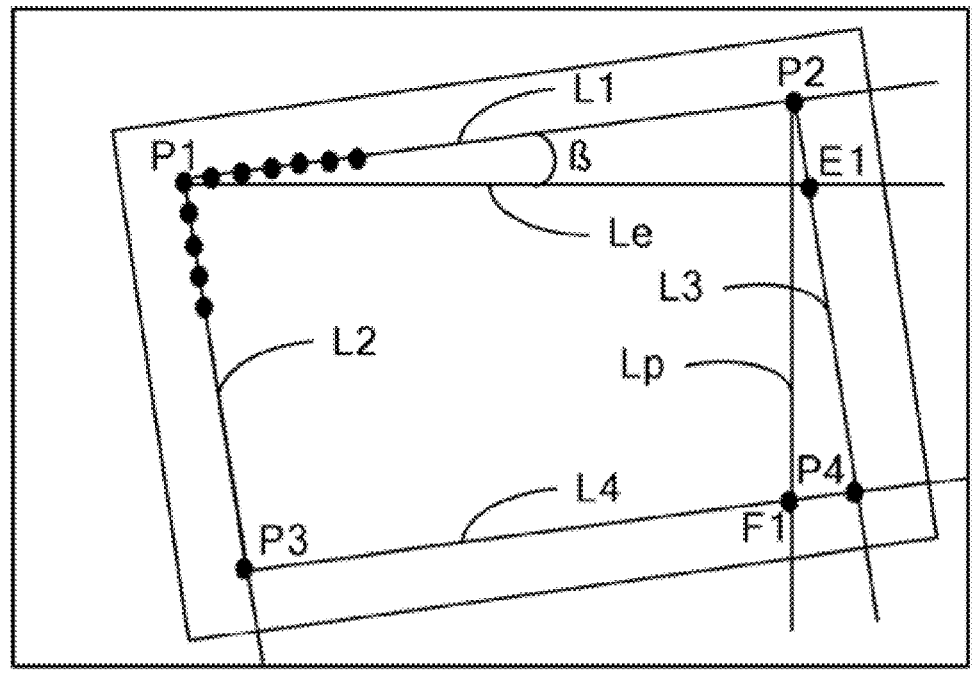
FIG. 8 is a schematic diagram showing a determined test area when the captured image of the display of FIG. 1 tilts to the left.

FIG. 7 is a flowchart for determining the test area of the image of the display 4 when the image of the display 4 tilts to the left. For a comprehensive understanding of FIG. 7, refer to FIG. 8.

In step S701, the second vertex determining module 3431 draws a first straight line through the first vertex P1 to the boundary pixels of the right side, and draws a second straight line through the first vertex P1 to the boundary pixels of the left side of the first vertex P1. The first straight line is taken as a first border L1 and the second straight line is taken as a second border L2.

In step S702, the second vertex determining module 3431 determines whether an angle between the first border L1 and a horizontal line Le is greater than a predetermined angle β.

In step S703, if the angle between the first border L1 and the horizontal line Le is greater than the predetermined angle β, the second vertex determining module 3431 adjusts the image of the display 4, and then the procedure goes to S702.

In step S704, if the angle between the first border L1 and the horizontal line Le is not greater than the predetermined angle β, the second vertex determining module 3431 reads pixels of the image from the first vertex until a boundary pixel E1 is found along a first predetermined direction. The boundary pixel E1 is a pixel whose RGB value difference D3 with a third predetermined RGB value is out of a third predetermined range. In this exemplary embodiment, the first predetermined direction is a horizontal direction.

In step S705, the second vertex determining module 3431 draws a first line parallel to the second border L2 through the boundary pixel E1. The first line is regarded as a third border L3 of the test area. The intersection point between the third border L3 and the first border L1 is regarded as a second vertex P2.

In step S706, the remainder vertices determining module 3432 reads pixels of the image from the second vertex P2 until a boundary pixel F1 is found along a second direction. The boundary pixel F1 is a pixel whose RGB value difference D4 with the third predetermined RGB value is out of the third predetermined range. In this exemplary embodiment, the second predetermined direction is a vertical direction.

In step S707, the remainder vertices determining module 3432 draws a second line parallel to the first border L1 through the boundary pixel F1. The second line is regarded as a fourth border L4 of the test area. The intersection point between the fourth border L4 and the second border L2 is regarded as a third vertex P3. The intersection point between the fourth border L4 and the third border L3 is regarded as a fourth vertex P4. The four borders collectively define the test area.

Figure 9:
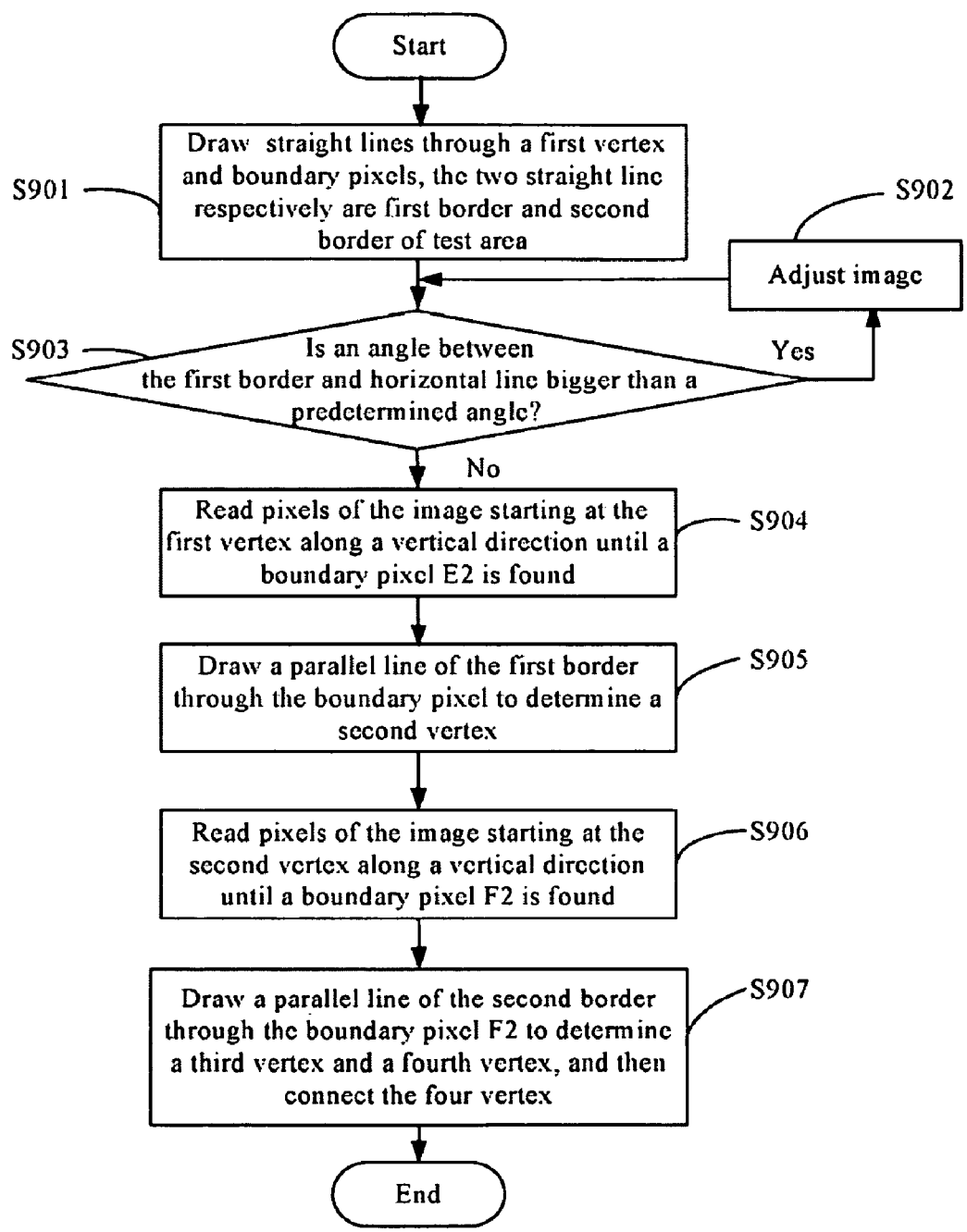
FIG. 9 is a flowchart for determining the test area when the captured image of the display of FIG. 1 tilts to the right.
Figure 10:
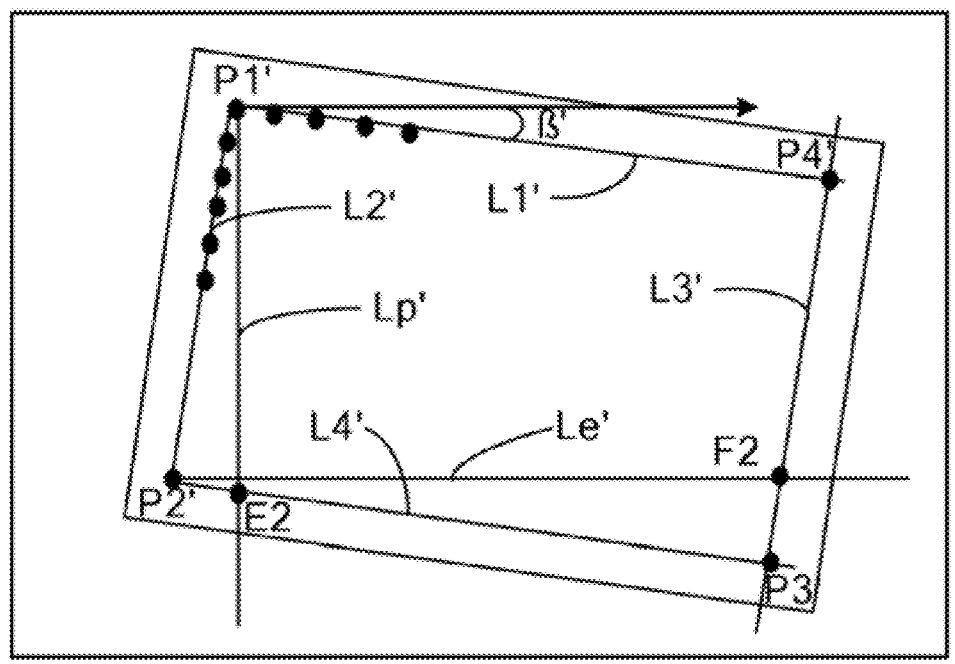
FIG. 10 is a schematic diagram showing the determined test area when the captured image of the display of FIG. 1 tilts to the right.

FIG. 9 is a flowchart for determining the test area of the image of the display 4 when the image of the display 4 tilts to the right. For a comprehensive understanding of FIG. 9, refer to FIG. 10.

In step S901, the second vertex determining module 3431 respectively draws a first straight line trough the first vertex P1' to the boundary pixels of the right side, and draws a second straights line trough the first vertex P1' to the boundary pixels of the left side. The first straight line is taken as a first border L1'. The second straight line is taken as a second border L2'.

In step S902, the second vertex determining module 3431 determines whether an angle between the first border L1' and the horizontal line Le is greater than a predetermined angle β'.

In step S903, if the angle between the first border L1' and the horizontal line Le is greater than the predetermined angle β', the second vertex determining module 3431 adjusts the image of the display 4, and then the procedure goes to step S902.

In step S904, if the angle between the first border L1' and the horizontal line Le is not greater than the predetermined angle β', the second vertex determining module 3431 reads pixels of the image from the first vertex P1' until a boundary pixel E2 is found along a first predetermined direction. The boundary pixel E2 is a pixel whose RGB value difference D5 with a third predetermined RGB value is out of a third predetermined range. In this exemplary embodiment, the first predetermined direction is a vertical direction Lp'.

In step S905, the second vertex determining module 3431 draws a third line parallel to the first border L1' through the boundary pixel E2. The third line is regarded as a fourth border L4' of the test area. The intersection point between the fourth border L4' and the second border L1' is regarded as a second vertex P2'.

In step S906, the remainder vertices determining module 3432 reads pixels of the image from the second vertex P2' until a boundary pixel F2 is found along a second predetermined direction. The boundary pixel F2 is a pixel whose RGB value difference D6 with the third predetermined RGB value is out of a third predetermined range. In this exemplary embodiment, the second predetermined direction is a horizontal direction Le'.

In step S907, the remainder vertices determining module 3432 draws a fourth line parallel to the second border L2' through the boundary pixel F2. The fourth line is regarded as a third border L3' of the test area. The intersection point between the fourth border L4 and the first border L1' is a third vertex P3'. The intersection point between the fourth border L4' and the first border L1' is regard as a fourth vertex P4'. The four borders collectively define the test area.

Figure 11:
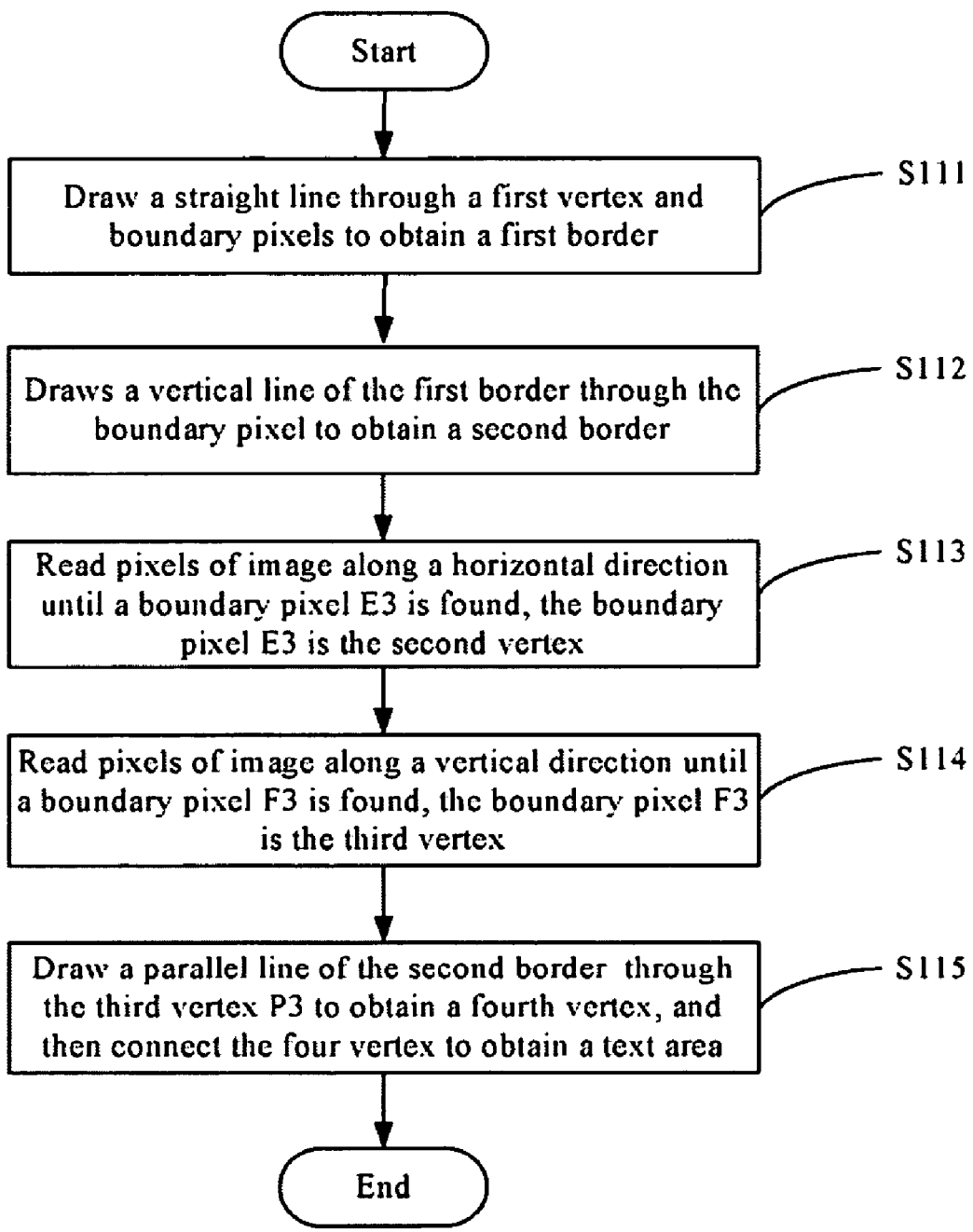
FIG. 11 is a flowchart for determining the test area when the captured image of the display of FIG. 1 does not tilt.
Figure 12:
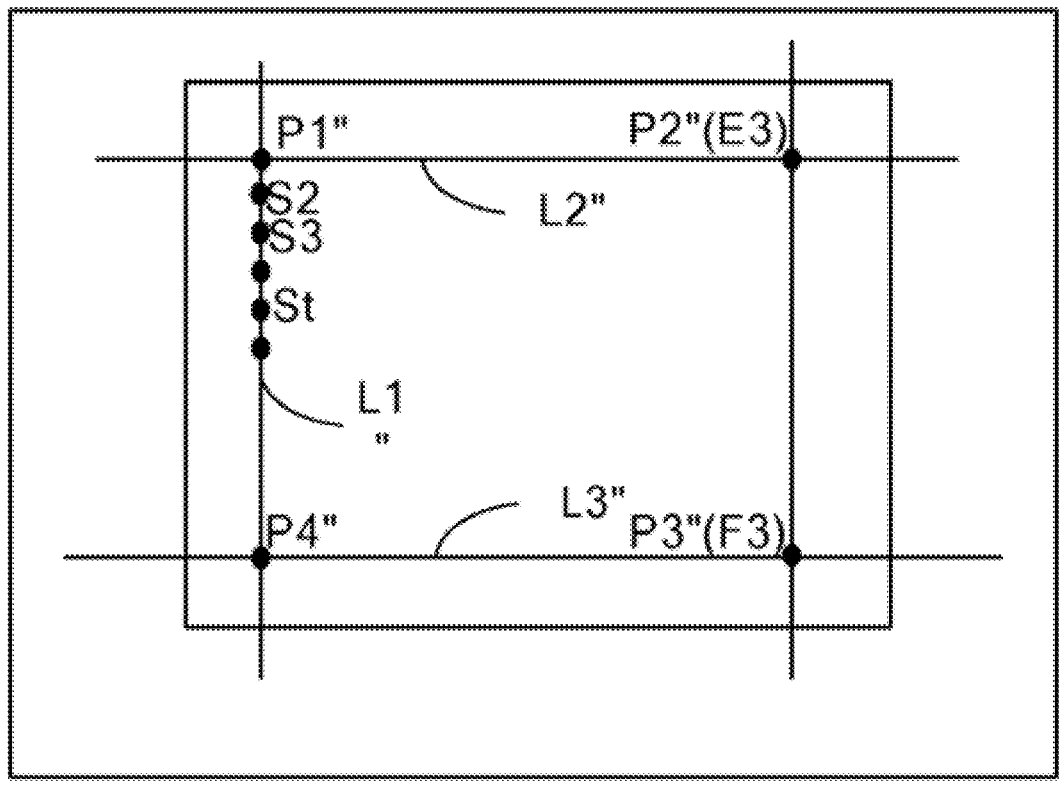
FIG. 12 is a schematic diagram for showing the determined test area when the captured image of the display of FIG. 1 does not tilt.

FIG. 11 is a flow chart for determining the test area of the image of the display 4 when the image of the display 4 does not tilt. For a comprehensive understanding of FIG. 11, refer to FIG. 12.

In step S111, the second vertex determining module 3431 draws a straight line through the first vertex P1" and the boundary pixels. The straight line is taken as a first border L1".

In step S112, the second vertex determining module 3431 draws a fifth line vertical to the first border L1" through the boundary pixel P1". The fifth line is the second border L2" of the test area.

In step S113, the second vertex determining module 3431 reads pixels of an image from the first vertex P1 until a boundary pixel E3 is found along the first predetermined direction. The boundary pixel E3 is a pixel whose RGB value difference D6 with the third predetermined RGB value is out of the third predetermined range. The boundary point E3 is regarded as a second vertex P2" of the test area. In this exemplary embodiment, the first predetermined direction is the horizontal direction.

In step S114, the remainder vertices determining module 3432 reads pixels of an image from the first vertex P1 until a boundary pixel F3 is found along the second predetermined direction. The boundary pixel F3 is a pixel whose RGB value difference D6 with the third predetermined RGB value is out of the third predetermined range. The boundary point F3 is regarded as the third vertex P3" of the test area. In this exemplary embodiment, the second predetermined direction is the vertical direction of the second border L2".

In step S115, the remainder vertices determining module 3432 draws a sixth line L3" parallel to the second border L2" through the third vertex P3". The intersection point between the sixth line L3" and the first border L1" is regarded as the fourth vertex P4". The four vertices are connected to form the test area.

When the test area has been determined, the testing module 344 tests related parameters, such as pixel conditions, and particularly dead pixels, according to the determined test area of the image of the display 4. During the process of testing for dead pixels, the testing module 344 computes the RGB value difference D7 between each pixel in the test area and a fourth predetermined RGB value. If the RGB value difference between a certain pixel and the predetermined RGB value is out of a fourth predetermined range, the pixel is determined to be dead.

Although the present invention has been specifically described on the basis of a preferred embodiment, the invention is not to be construed as being limited thereto. Various changes or modifications may be made to the embodiment without departing from the scope and spirit of the invention.

What is claimed is:

1. A display testing apparatus connected with an image capturing device, the apparatus comprising:
   a storage;
   an image capturing module capable of controlling the image capturing device to capture an image of a to-be-tested display and storing the captured image to the storage;
   a first vertex determining module capable of determining a first vertex of a test area on the captured image, comprising:
      a boundary pixels determining sub-module capable of determining a predetermined rectangular area which includes the first vertex, and determining boundary pixels according to RGB values of each pixel in the predetermined rectangular area; and
      a vertex determining sub-module capable of determining the first vertex among the determined boundary pixels according to coordinates of the boundary pixels;
   a test area determining module capable of determining the test area, comprising:
      a second vertex determining sub-module capable of lining the boundary pixels of the right side of the first vertex through the first vertex to obtain a first border, and lining the boundary pixels of the left side of the first vertex through the first vertex to obtain a second border;
      the second vertex determining sub-module further capable of reading pixels of the captured image from the first vertex until a first boundary pixel is found along a first direction, determining a first line parallel to the second border through the first boundary pixel to obtain a third border of the test area, and obtaining a second vertex which is an intersection between the third border and the first border; and
      a remainder vertices determining sub-module capable of reading pixels of the captured image from the second vertex until a first boundary pixel is found along a second direction, determining a second line parallel to the first border through the first boundary pixel to obtain a fourth border of the test area, obtaining a third vertex which is an intersection between the fourth border and the second border, obtaining a fourth vertex which is an intersection between the fourth border and the third border, and defining the test area according to the first vertex, the second vertex, the third vertex, and the fourth vertex; and
   a testing module is configured for testing parameters of the display according to the test area.

2. The apparatus as described in claim 1, wherein the boundary pixels determining sub-module is further capable of determining the boundary pixels according to a predetermined process, wherein the predetermined process is: the boundary pixels determining sub-module obtains the RGB value of each pixel of the predetermined rectangle row by row or column by column, computes an RGB value difference D1 between a current pixel and a previous pixel; if D1 is out of a first predetermined range, the boundary pixels determining sub-module computes an RGB value difference D2 between the RGB value of the current pixel and a second predetermined RGB value; if D2 is in a predetermined range, the boundary pixels determining sub-module takes the current pixel as the boundary pixel; if D2 is not in the predetermined range, the boundary pixels determining sub-module takes the previous pixel as the boundary pixel, and repeats the predetermined process until all the pixels in the predetermined rectangle are read.

3. The apparatus as described in claim 1, wherein the second vertex determined sub-module is further capable of determining whether an angle between the first border and a horizontal line is greater than a predetermined angle, if the angle is greater than the predetermined angle, adjusts the image of the display until the angle is not greater than the predetermined angle.

4. The apparatus as described in claim 1, wherein if horizontal coordinates of a serial of successive boundary pixels are in a descending order, the vertex determining sub-module is capable of comparing the horizontal coordinates of two adjacent boundary pixels until a current boundary pixel whose horizontal coordinate is smaller than the horizontal coordinate of a next boundary pixel, and the vertex determining sub-module is capable of determining the current boundary pixel as the first vertex.

5. The apparatus as described in claim 4, wherein the first predetermined direction is a horizontal direction, and the second predetermined direction is a vertical direction.

6. The apparatus as described in claim 1, wherein if horizontal coordinates of a series of successive boundary pixels are not in a descending order, the vertex determining sub-module takes the first boundary pixel as the first vertex.

7. The apparatus as described in claim 6, wherein the first predetermined direction is a vertical direction, and the second predetermined direction is a horizontal direction.

8. A method of a display testing apparatus, the apparatus being connected with an image capturing device, the method comprising:
  (a) controlling the image capturing device to a capture image of a to-be-tested display and storing the captured images;
  (b) determining a first vertex of a test area on the captured image, comprising:
    (b1) determining a predetermined rectangle area which includes the first vertex,
    (b2) determining boundary pixels according to RGB values of each pixel in the predetermined rectangular area; and
    (b3) determining the first vertex among the determined boundary pixels according to coordinates of the boundary pixels;
  (c) determining the test area, comprising:
    (C1) lining the boundary pixels of the right side of the first vertex through the first vertex to obtain a first border, and lining the boundary pixels of the left side of the first vertex through the first vertex to obtain a second border;
    (c2) reading pixels of the captured image from the first vertex until a first boundary pixel is found along a first direction, determining a first line parallel to the second border through the first boundary pixel to obtain a third border of the test area, and obtaining a second vertex which is an intersection between the third border and the first border;
    (c3) reading pixels of the captured image from the second vertex until a first boundary pixel is found along a second direction;
    (c4) determining a second line parallel to the first border through the first boundary pixel to obtain a fourth border of the test area;
    (c5) obtaining a third vertex which is an intersection between the fourth border and the second border; and
    (c6) obtaining a fourth vertex which is an intersection between the fourth border and the third border, and defining the test area according to the first vertex, the second vertex, the third vertex, and the fourth vertex; and
  (d) testing parameters of the display according to the test area.

9. The method as described in claim 8, wherein step (b2) further comprises:
  determining the boundary pixels according to a predetermined process, wherein the predetermined process is:
    obtaining the RGB value of each pixel of the predetermined rectangle row by row or column by column;
  computing an RGB value difference D1 between a current pixel and a previous pixel;
  computing an RGB value difference D2 between the RGB value of the current pixel and a second predetermined RGB value if D1 is out of a first predetermined range;
  taking the current pixel as the boundary pixel if D2 is in a predetermined range;
  taking the previous pixel as the boundary pixel if D2 is not in the predetermined range; and
  repeating the predetermined process until all the pixels in the predetermined rectangle are read.

10. The method as described in claim 8, further comprising:
  determining whether an angle between the first border and a horizontal line is greater than a predetermined angle;
  adjusting the image of the display until the angle is not greater than the predetermined angle if the angle is greater than the predetermined angle;
  comparing values of horizontal coordinate of two adjacent boundary pixel until a special pixel whose value of the horizontal coordinate is smaller than the value of the horizontal coordinate of the next boundary pixel if the value of the horizontal coordinate of the first three boundary pixel is decreased in turn; and
  taking the special pixel as the first vertex.

11. The method as described in claim 8, wherein the first vertex determining steps further comprises: taking the first boundary pixel as the first vertex if the value of the horizontal coordinate of the first three boundary pixel is not decreased in turn.

* * * * *